United States Patent [19]

Kisak

[11] Patent Number: 4,888,787
[45] Date of Patent: Dec. 19, 1989

[54] RECEIVER APPARATUS FOR SPREAD SPECTRUM COMMUNICATION SYSTEMS

[76] Inventor: David Kisak, 2440 Research Blvd., Rockville, Md. 20850

[21] Appl. No.: 249,511

[22] Filed: Sep. 26, 1988

[51] Int. Cl.⁴ .............................................. H04K 1/02
[52] U.S. Cl. ...................................................... 375/1
[58] Field of Search ................ 375/1; 380/34; 364/825

[56] References Cited

U.S. PATENT DOCUMENTS

| | | | |
|---|---|---|---|
| 4,287,475 | 9/1981 | Eaton et al. | 364/825 |
| 4,288,750 | 9/1981 | Newton et al. | 375/1 |
| 4,454,604 | 6/1984 | Myers | 375/1 |
| 4,479,227 | 10/1984 | Bjornholt | 375/1 |
| 4,656,642 | 4/1987 | Apostolos et al. | 375/1 |
| 4,672,629 | 6/1987 | Beir | 375/1 |
| 4,761,795 | 8/1988 | Beir | 375/1 |

*Primary Examiner*—Salvatore Cangialosi
*Attorney, Agent, or Firm*—Laubscher, Presta & Laubscher

[57] ABSTRACT

Receiver apparatus is provided for processing frequency hopped signals produced by frequency hopping or hybrid spread spectrum communication systems. A received frequency stepped carrier input signal is applied to dispersive delay lines connected in parallel branches and squaring circuits square the outputs of the dispersive delay lines. A comparator compares the outputs of the squaring circuits and produces an output related to the difference between the these outputs while an integrator integrates, over time, the comparator output and produces a corresponding output voltage signal. A voltage controlled oscillator connected to the output of the integrator produces an output signal whose frequency is related to the output voltage of the integrator. This signal is representative of the instantaneous frequency of the carrier input and can thus be used to demodulate the received signal.

9 Claims, 2 Drawing Sheets

RECEIVER APPARATUS FOR SPREAD SPECTRUM COMMUNICATION SYSTEMS

FIELD OF THE INVENTION

The present invention relates to spread spectrum communication systems and, more particularly, to improved receivers and receiving techniques for frequency hopping and hybrid spread spectrum communication systems.

BACKGROUND OF THE INVENTION

In general, spread spectrum communication systems employ a method of communication wherein the transmission bandwidth is broader or wider than the information bandwidth but is not a function of the information bandwidth. Two articles of background interest here which discuss the nature and development of prior art spread spectrum communication systems are: Scholtz, "The Origins of Spread Spectrum Communications", IEEE Transactions on Communications, Vol COM 30, No. 5, May 1982; and Utlaut, "Spread Spectrum: Principles and Possible Application to Spectrum Utilization and Allocation", ITU Telecommunication Journal, Vol. 45, pp. 20-32, Jan. 1978.

Spread spectrum communication systems can generally be broken down into three basic types: (1) direct sequence systems; (2) frequency hopping systems; and (3) hybrid system. Broadly speaking, direct sequence (DS) spread spectrum communication systems involve multiplication of the information to be transmitted by a spreading code and transmitting the resultant product. On the other hand, frequency hopping (FH) spread spectrum communication systems provide for random selection of a carrier frequency using a random code. Hybrid systems, as the name implies, combine aspects of both DS and FH spread spectrum communication systems.

As will appear, the present invention concerns improvements in receivers for frequency hopping and hybrid systems. For hybrid systems incorporating this improvement, it is assumed that the spreading code for the direct sequence is known, i.e., the spreading code must be in phase with the code in the transmitted signal as received at the receiver. This information also must be known for frequency hopping systems although the code can be different. In other words, the invention is an improvement on systems wherein the receiver knows, and is in synchronism with, the direct sequence spread spectrum code. On the other hand, as will also appear, among other advantages of the invention is the advantage that knowledge of the hopping code is not required.

A general advantage of all spread spectrum communication systems is the minimization of the effects of narrow band interference. In particular, the direct sequence signal is despread or collapsed into a narrow band (with the overall band width being reduced by the direct sequence bandwidth) and the interference is spread out over the band. A relatively broad frequency band is required for frequency hopping, e.g., a bandwidth of 50 MHz is used for an instantaneous frequency signal band of 25 kHz. A frequency discriminator output is desired (which corresponds to or is representative of, a voltage-frequency plot) so as to determine, over a wide frequency range based on the voltage output, the frequency of the carrier at any instant of time. With this information, demodulation of the received signal can be carried out in a conventional manner.

SUMMARY OF THE INVENTION

In accordance with the invention, a receiver for frequency hopping and hybrid spread spectrum communication systems is provided which enables demodulation of transmitted signal without knowing or requiring: (i) the hopping code of the transmitted signal, (ii) the instantaneous frequency of that signal, (iii) the time duration over which the transmitted signal remains at a particular frequency, and (iv) the time of transition between frequencies. It will, of course, be understood that conventional receivers cannot be used to determine the instantaneous input frequency because of noise considerations, and thus conventional frequency hopping systems require knowledge of the hopping code.

In general, the present invention uses surface acoustic wave (SAW) technology, and, in particular, dispersive delay lines, in implementing a frequency-sensitive differential-energy discriminator for a frequency hopping or hybrid spread spectrum receiver. It will be appreciated that the output desired is that of a frequency discriminator wherein the output voltage is a function of the input frequency in that, as explained above, with such an output a determination can be made of the frequency of the carrier at an instant to thereby enable the input signal to be demodulated.

Some features and advantages of the invention include the fact that the input bandwidth is only limited by the technology available (and current surface acoustic wave technology enables very wide bandwidths to be used) and as mentioned above, a priori knowledge of the hop pattern or code is not needed, nor is hop rate information. The discriminator of the invention is not sensitive to narrow band or wide band interference and because the invention is based on, i.e., employs, time-domain processing, the invention possesses the advantages attendant this kind of processing. In addition, substantial advantages with respect to temperature sensitivity are provided in that SAW devices can be made virtually temperature insensitive.

Applications of the invention include use in a hybrid spread-spectrum despread receiver carrier tracking loop, for non-coherent and possibly coherent loops, as well in frequency hopping networks using radiometric techniques t detect differential energy changes (i.e., power measurement techniques can be used to sort out plural communications within the area of the network).

According to the invention, a receiver apparatus is provided for processing frequency hopped signals produced by frequency hopping or hybrid spread spectrum communication systems, wherein the receiver apparatus comprises: first and second dispersive delay lines connected in parallel branches to which a received frequency stepped carrier input signal is applied; a first squaring circuit connected to the output of the first dispersive delay line; a second squaring circuit connected to the output of the second dispersive delay line; comparator means for comparing the outputs of the first and second squaring circuits and for producing an output related to the difference between the outputs of the squaring circuits; integrator means for integrating, over time, the output of the comparator means and for producing a corresponding output voltage signal; and a voltage controlled oscillator connected to the output of the integrator means for producing an output signal the frequency of which is related to the output voltage of the integrator means and is representative of the instantaneous frequency of the carrier input.

In accordance with one preferred embodiment, the same input signal is applied to both branches, and accordingly, in this embodiment, one dispersive delay line has a positive frequency-time characteristic while the other dispersive delay line has a negative frequency-time characteristic.

In accordance with a second embodiment, a normal image input signal is applied to one dispersive delay line and an inverted image input signal is applied to the other dispersive delay line, and the frequency-time characteristics of the first and second delay lines are matched. Advantageously, a frequency converter, comprising a local oscillator, is used to produce the normal image input signal and the inverted image input signal as sidebands of an intermediate frequency signal.

In one application of the invention, first and second mixers are respectively connected to the inputs of the first and second dispersive delay lines and the output of the voltage controlled oscillator is connected as an input to each of the first and second mixers, so as to form a Costas loop configuration.

Other features and advantages of the invention will be set forth in, or apparent from, the detailed description of preferred embodiments of the invention which follows.

DESCRIPTION OF THE PREFERRED EMBODIMENTS

Figure 1:
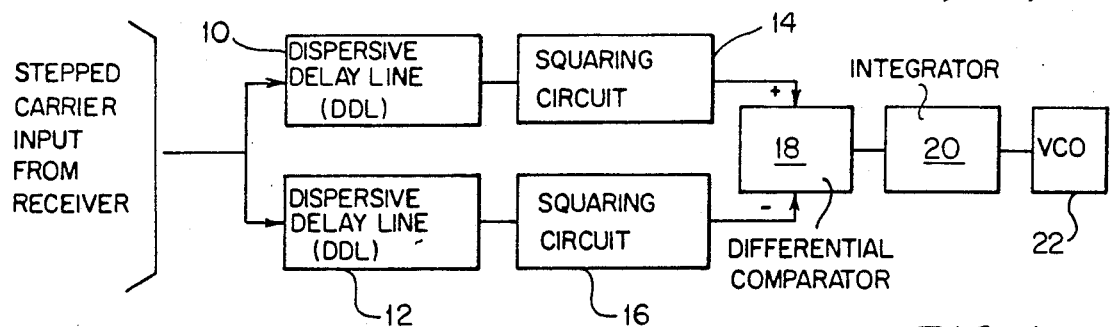
FIG. 1 is a block diagram of a preferred embodiment of the spread spectrum signal processing system of the invention.
Figure 2A:
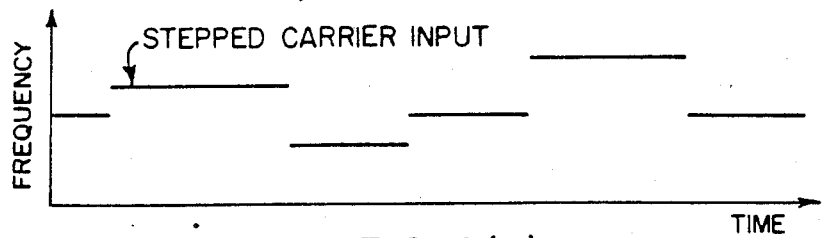
FIGS. 2(a) to 2(e) are time domain wave forms associated with the system of FIG. 1.

Referring to FIG. 1, a frequency discriminator constructed in accordance with a first preferred embodiment of the invention is shown. The input to the discriminator is the stepped carrier input of the receiver of a conventional frequency hopping or hybrid spread spectrum communication system. An exemplary stepped carrier input is shown in FIG. 2(a) wherein the frequency steps up, arbitrarily, from an initial value generally in the mid-range of the frequency spectrum to a higher value for a relatively long time, down to a lower value below the mid-range for a shorter time than in the previous step, up to the mid-range value for a time substantially equal to that of the previous step, up again to a higher value for a longer time and so on. It will be appreciated that the frequency values and time durations shown are merely illustrative and other, very different patterns can occur.

Figure 3:
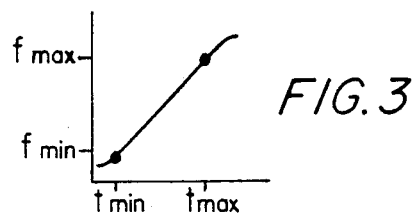
FIGS. 3 and 4 are the respective frequency-time characteristics of the two dispersive delay lines of the system of FIG. 1.
Figure 4:
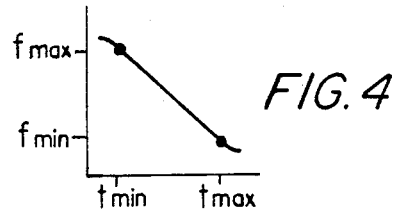

As shown in FIG. 1, the stepped carrier input is applied to a pair of dispersive delay lines 10 and 12. A dispersive delay line is a conventional surface acoustic wave (SAW) device wherein a crystal having piezoelectric properties provides predetermined frequency delay characteristics. Two important characteristics of such devices are broad bandwidth operation and a delay time which is a function of frequency. Dispersive delay lines (DDLs) can be obtained as commercial, off-the-shelf products, as manufactured, e.g., by Anderson Laboratories. The delay characteristics of DDL 10 are shown in FIG. 3 and, as illustrated, a "positive" characteristic is provided wherein the delay produced increases generally linearly with frequency. The delay characteristics of DDL 12 are shown in FIG. 4 and, as illustrated, a "negative" or inverse characteristic is provided wherein the delay produced decreases with an increase in frequency.

As shown in FIG. 12, the outputs of DDL 10 and DDL 12 are individually connected to squaring circuits or squarers 14 and 16, respectively, which function to square the inputs thereto, and the outputs of which are connected to a comparator circuit 18 which basically functions as a subtraction circuit or subtractor. The differential output of comparator 18 is integrated by an integrator 20, the output of which is connected to a voltage controlled oscillator (VCO) 22.

Figure 2B:
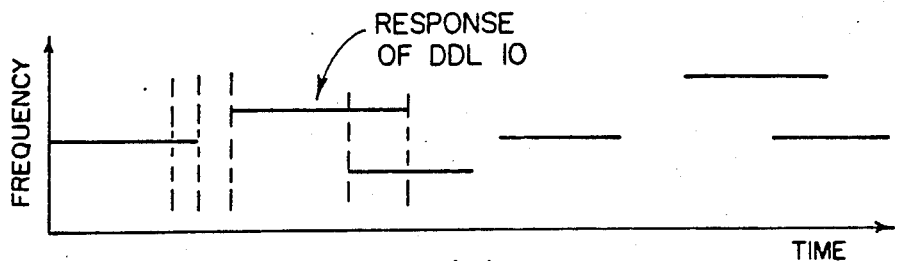
Figure 2C:
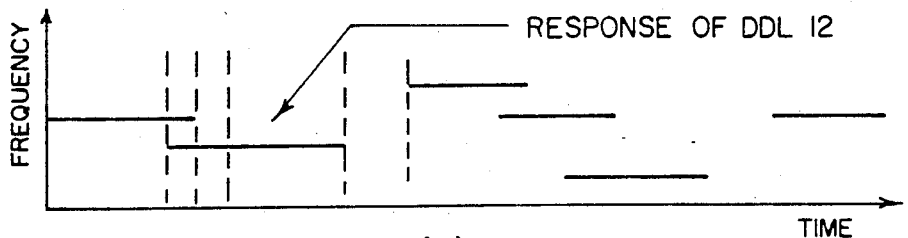

The operation of the frequency discriminator circuit of FIG. 1 can perhaps best be understood by reference to FIGS. 2(a) to 2(e). Thus, referring to FIGS. 2(a) and 2(b), it will be seen in FIG. 2(b) that DDL 10, in accordance with the frequency-time characteristic shown in FIG. 3, delays the first "mid-range" frequency a predetermined amount, delays the next, higher frequency step more, and delays the next, lower frequency step less and so on, so that a stepped frequency versus time pattern is produced, as illustrated. On the other hand, as illustrated in FIG. 2(c), DDL 12 delays the initial "mid-range" frequency a predetermined amount, delays the next, higher frequency a lesser amount and delays the next, lower frequency a greater amount. It will be noted that the "mid-range" frequency is delayed approximately the same amount by each of the dispersive delay lines 10 and 12 which is, of course, consistent with the characteristics of each.

Referring to 2(d), the output of comparator 18 is shown. It will be understood that squaring circuits 14 and 16 by squaring the voltages outputs of DDL 10 and DDL 12 produce corresponding outputs which are proportional to power. Comparator 18 compares these outputs and produces an output proportional to the differential input power.

Figure 2D:
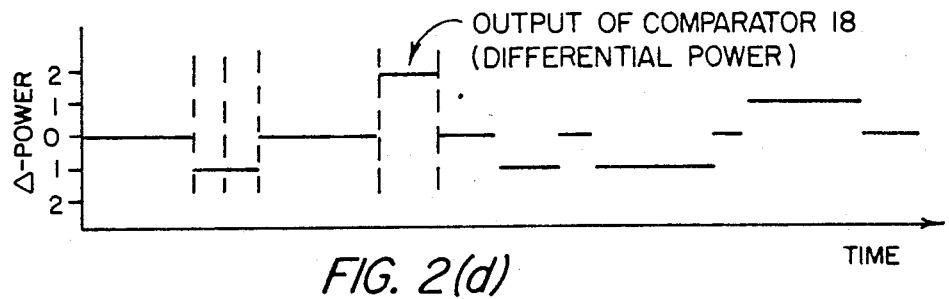

To understand the derivation of the output shown in FIG. 2(d), it is helpful to explore some examples. It will be seen that the outputs of DDL 10 and DDL 12 are the same during an initial period so that the differential output power is zero. At the end of that period (indicated in FIG. 2(d) by the first vertical dashed line), the output of DDL 12 also includes a component derived from the second frequency step so that there is a net one unit power differential, using the scale of FIGS. 2(d). Similarly, during the next time interval (beginning at the second vertical dashed line), there is no output from DDL 10, and the only output from the DDL 12 is that produced in response to the second step of the stepped carrier input. Thus, the differential power output is still a one unit increment. At the end of this period (indicated by the third vertical dashed line), the outputs of the two dispersive delay lines are equal and thus offset or cancel one another and this, again, results in a zero differential power output. At the end of this period, the output of DDL 10 is a combination of the end of the response thereof to the second step and the beginning of the response thereof to the third step of the carrier as shown in FIG. 2(b) while the output of DDL 12 is zero as shown in FIG. 2(b), thus the differential power is two positive units as indicated in FIG. 2(d).

Figure 2E:
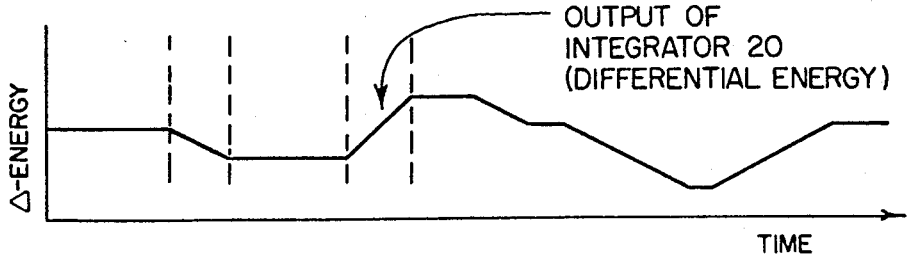

Referring to FIG. 2(e), the output of integrator 20, being the integral of the output of comparator 18, tracks the latter so that the output signal produced by integrator 20, which is proportional to the differential energy (energy being the integral of power over time) is of the character illustrated. In particular, the output of integrator 20 begins at an initial value corresponding to the mid-range frequency, drops to a lower value or level during the next period (i.e., during the period when the response of DDL 12 is greater than that of DDL 10 as discussed above), remains at that lower level during the next period (i.e., the period during which there is no differential between the outputs of DDL 10 and DDL 12) rises sharply during the next period (i.e., the period during the which the differential output of comparator 18 corresponds to the two unit power differential between the DDLs) and remains at that level during the next period wherein, again, there is no differential power output from comparator 18.

It will be appreciated that by applying the voltage output of integrator 20 to voltage controlled oscillator 22, an oscillator frequency output will be produced which is proportional to the voltage shown in FIG. 2(e) and which represents the instantaneous frequency of the carrier input. Thus, since it is now known where the carrier frequency is at any instant of time, demodulation can be performed in a conventional manner.

Figure 5:
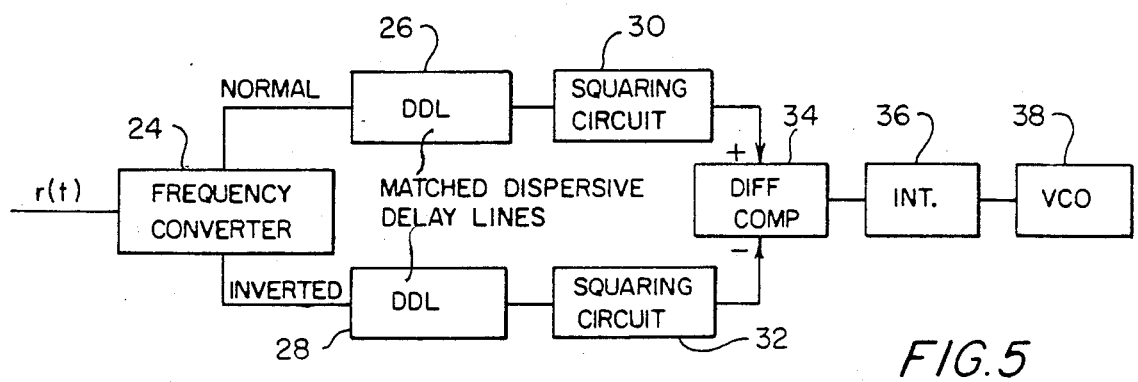
FIG. 5 is a block diagram of a spread spectrum signal processing system in accordance with a further preferred embodiment of the invention.

Referring to FIG. 5, a further embodiment is shown which is similar to that of FIG. 1 but which uses matched dispersive delay lines and employs an inverted input spectrum as an input to one of the matched delay lines. It will be understood that the term "inverted spectrum" refers to spectrum wherein the high and low frequency components are transposed relative to a "normal spectrum" so that, for example, a low frequency component of the normal spectrum appears as a high frequency component in the inverted spectrum. As illustrated, the receiver input signal r(t) is fed to a frequency converter 24 which is used to derive the normal and inverted inputs. More particularly, in a preferred embodiment, a local oscillator is used to convert the received signal into an intermediate frequency signal, with sidebands, for processing. A first one of these sidebands is selected to produce an output which is a normal image that is fed to a first dispersive delay line 26 and the other sideband is selected to produce an output which is an inverted image that is fed to a second dispersive delay line 28, the frequency-time characteristics of which are matched to, i.e., the same as or very similar to those of DDL 26. It will be understood that using a normal and inverted spectrum in combination with matched DDLs, the net operation is essentially the same as described above in that the output of DDL 28 (which is connected to the inverted output of frequency converter 24) will be basically as that of DDL 12 of FIG. 1. Moreover, the connections between, and the operation of, the remaining circuitry, including squaring circuits 30 and 32, comparator 34, integrator 36 and VCO 30, are also the same as described above for FIG. 1 and hence further description of the embodiment of FIG. 5 is not seen to be necessary.

Figure 6:
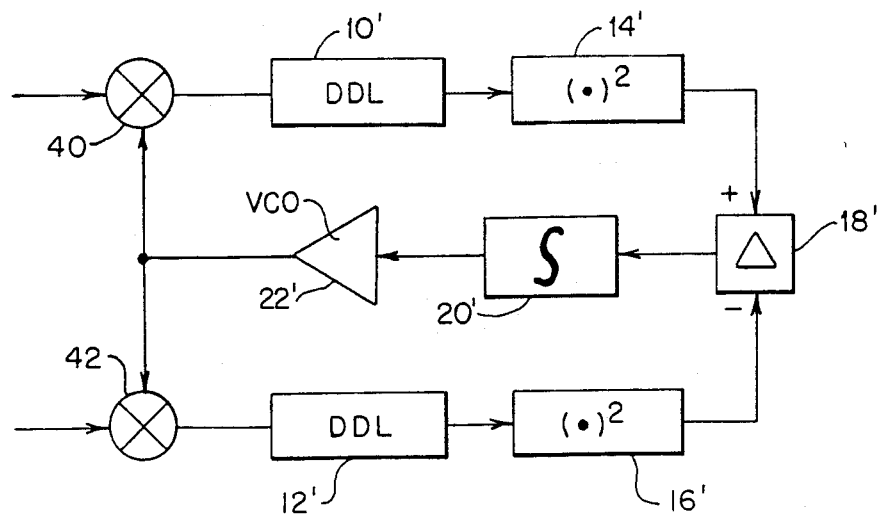
FIG. 6 is a block diagram of a modified Costas loop incorporating the signal processing system of FIG. 1.

Referring to FIG. 6, one application of the invention is illustrated wherein the circuitry of FIG. 1 is incorporated in a modified Costas loop. The components or units of FIG. 6 which are the same as, or similar to, those of FIG. 1 have been same numbers with primes attached. In the circuit of FIG. 6, the outputs of mixers 40 and 42 from the inputs of DDL 10' and DDL 12', respectively and the output of VCO 22' forms the second inputs to a pair of mixers 40 and 42.

Although the present invention has been described relative to exemplary embodiments thereof, it will be understood by those skilled in the art that variations and modifications can be effected in these exemplary embodiments without departing from the scope and spirit of the invention.

I claim:

1. Receiver apparatus for processing frequency hopped signals produced by frequency hopping or hybrid spread spectrum communication systems, said receiver apparatus comprising:
   first and second dispersive delay lines connected in parallel branches to which a received frequency stepped carrier input signal is applied;
   a first squaring circuit connected to said first dispersive delay line for squaring the output thereof;
   a second squaring circuit connected to said second dispersive delay line for squaring the output thereof;
   comparator means for comparing the outputs of said first and second squaring circuits and for producing an output related to the difference between the outputs of said squaring circuits;
   integrator means for integrating over time the output of said comparator means and for producing a corresponding output voltage signal; and
   a voltage controlled oscillator connected to the output of said integrator means for producing an output signal the frequency of which is related to the output voltage of said integrator means and is representative of the instantaneous frequency of the carrier input.

2. Apparatus as claimed in claim 1 wherein the same input signal is applied to both branches and wherein said one of said dispersive delay lines has a positive frequency-time characteristic and the other of said dispersive delay lines has a negative frequency-time characteristic.

3. Apparatus as claimed in claim 1 wherein a normal image input signal is applied to one of said dispersive delay lines and an inverted image input signal is applied to the other of said dispersive delay lines, and the frequency-time characteristics of said first and second dispersive delay lines are matched.

4. Apparatus as claimed in claim 3 wherein a frequency converter, comprising a local oscillator, is used to produce said normal image input signal and said inverted image input signal as sidebands of an intermediate frequency signal.

5. Apparatus as claimed in claim 4 further comprising first and second mixers respectively connected to the inputs of said first and second dispersive delay lines, the output of said voltage controlled oscillator being connected as an input to each of the first and second mixers.

6. Apparatus as claimed in claim 2 further comprising first and second mixers respectively connected to the inputs of said first and second dispersive delay lines, the output of said voltage controlled oscillator being connected as an input to each of the first and second mixers.

7. Receiver apparatus for processing frequency hopped signals produced by frequency hopping or hybrid spread spectrum communication systems, said receiver apparatus comprising:

first and second parallel connected dispersive delay lines to which a received frequency stepped carrier input signal is applied, one of dispersive delay lines having a positive frequency-time characteristic and the other of said dispersive delay lines having a negative frequency-time characteristic.

a first squaring circuit connected to the output of said first dispersive delay line;

a second squaring circuit connected to the output of the second dispersive delay line;

comparator means for comparing the outputs of said first and second squaring circuits and for producing an output related to the difference between the outputs of said squaring circuits;

integrator means for integrating over time the output of said comparator means and for producing a corresponding output voltage signal; and a voltage controlled oscillator connected to the output of said integrator means for producing a output signal the frequency of which is related to the output voltage of said integrator means and is representative of the instantaneous frequency of the carrier input.

8. Receiver apparatus for processing frequency hopped signals produced by frequency hopping or hybrid spread spectrum communication systems, said receiver apparatus comprising:

a first dispersive delay line to which a normal image input signal related to the received carrier input signal is applied;

a second dispersive delay line to which an inverted image input signal related to the received carrier input signal is applied, the frequency-time characteristics of said first and second dispersive delay lines being matched;

a first squaring circuit connected to the output of said first dispersive delay line;

a second squaring circuit connected to the output of the second dispersive delay line;

comparator means for comparing the outputs of said first and second squaring circuits and for producing an output related to the difference between the outputs of said squaring circuits;

integrator means for integrating over time the output of said comparator means and for producing a corresponding output voltage signal; and a voltage controlled oscillator connected to the output of said integrator means for producing an output signal the frequency of which is related to the output voltage of said integrator means and is representative of the instantaneous frequency of the carrier input.

9. Apparatus as claimed in claim 8 wherein a frequency converter, comprising a local oscillator, is used to produce said normal image input signal and said inverted image input signal as sidebands of an intermediate frequency signal.

* * * * *